United States Patent [19]

Rakowicz et al.

[11] 4,024,064
[45] May 17, 1977

[54] LIQUID TREATING SYSTEM AND INCLUDED FILTER ASSEMBLY

[75] Inventors: Maurice R. Rakowicz, Castro Valley; John J. Rodrigues, Orinda, both of Calif.

[73] Assignee: Kordon Corporation, Hayward, Calif.

[22] Filed: Mar. 23, 1973

[21] Appl. No.: 344,136

[52] U.S. Cl. .............................. 210/258; 210/169; 210/416 R
[51] Int. Cl.² ........................................ B01D 35/26
[58] Field of Search .......... 210/169, 258, 335, 339, 210/473, 482, 498, 416

[56] References Cited
UNITED STATES PATENTS

| 915,695 | 3/1909 | Perrin | 210/335 X |
|---|---|---|---|
| 2,334,802 | 11/1943 | Zuckermann | 210/335 |
| 3,011,643 | 12/1961 | McCoy | 210/169 |
| 3,273,717 | 9/1966 | Canterbury | 210/169 |
| 3,371,792 | 3/1968 | Weyand et al. | 210/335 |
| 3,386,580 | 6/1968 | Grabarczyk | 210/335 X |
| 3,392,836 | 7/1968 | Willinger | 210/169 |
| 3,512,646 | 5/1970 | Willinger | 210/169 |
| 3,630,373 | 12/1971 | Grazen | 210/416 X |

Primary Examiner—Thomas G. Wyse
Assistant Examiner—Robert H. Spitzer
Attorney, Agent, or Firm—Harris Zimmerman

[57] ABSTRACT

A liquid treating system primarily for use in connection with aquariums, involves a modular filter assembly and a pump in cooperation with improved system components such as an intake strainer, a discharge distributor and means for supporting the connecting hose lines to the aquarium tank.

6 Claims, 14 Drawing Figures

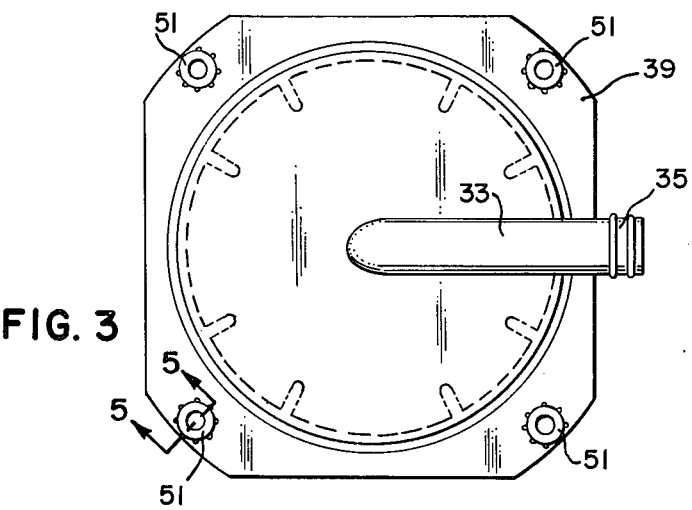
FIG. 3
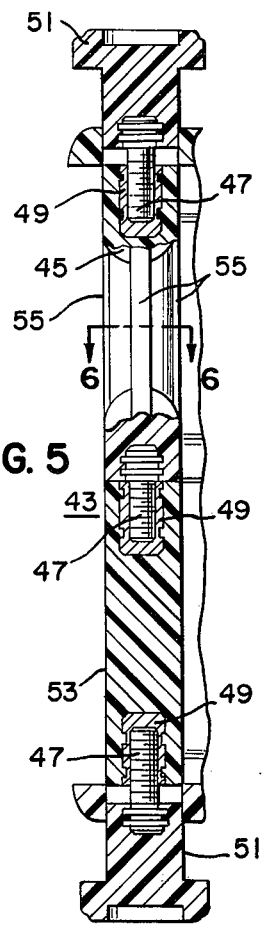
FIG. 5
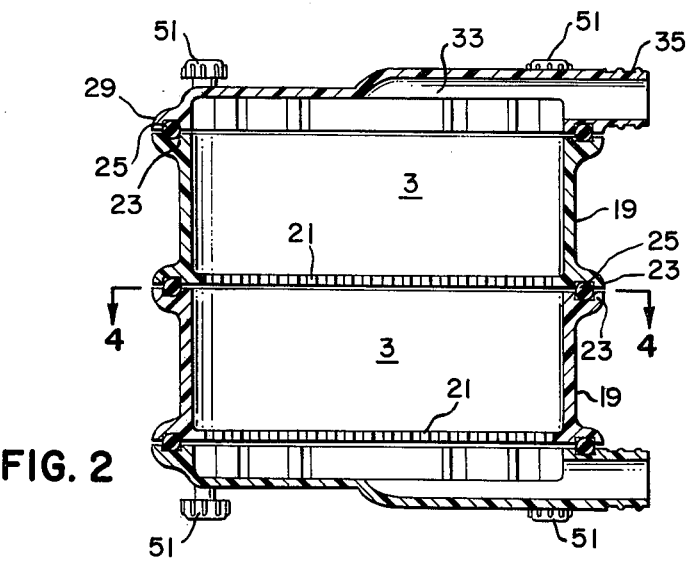
FIG. 2
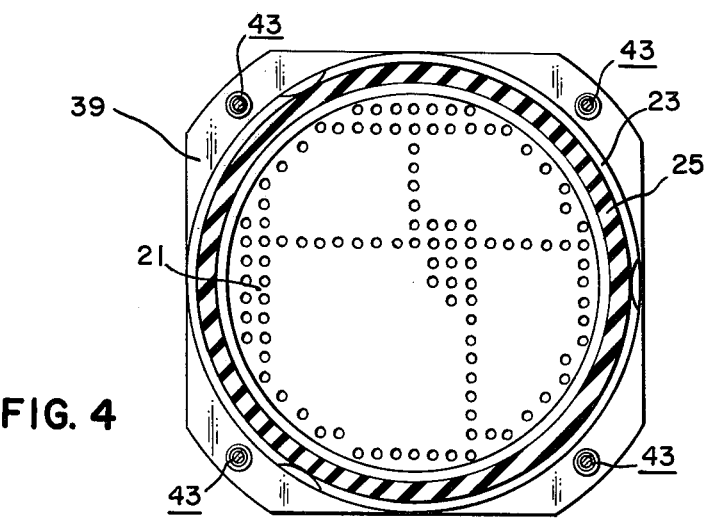
FIG. 4
FIG. 6
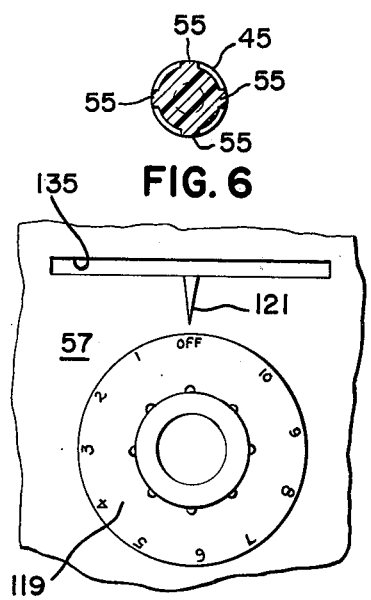
FIG. 7

U.S. Patent   May 17, 1977   Sheet 3 of 3   4,024,064
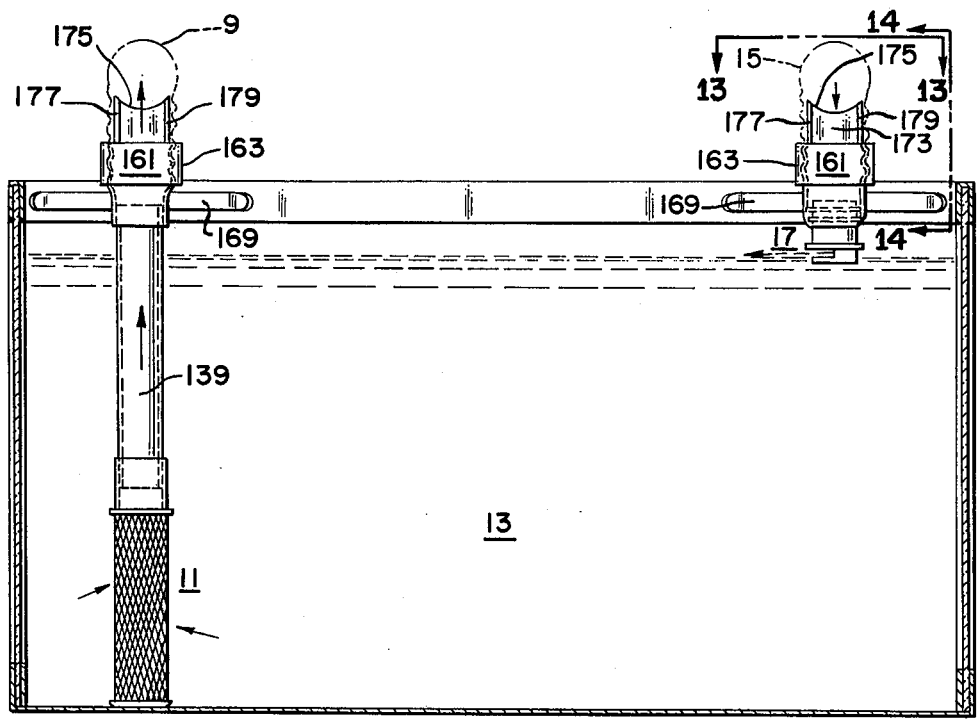
FIG. 8
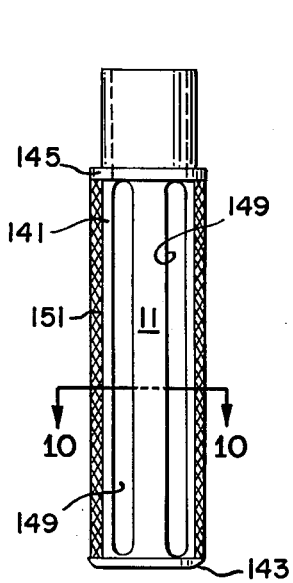
FIG. 9
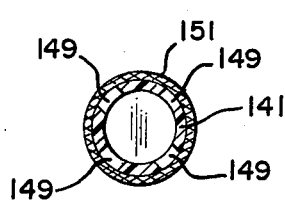
FIG. 10
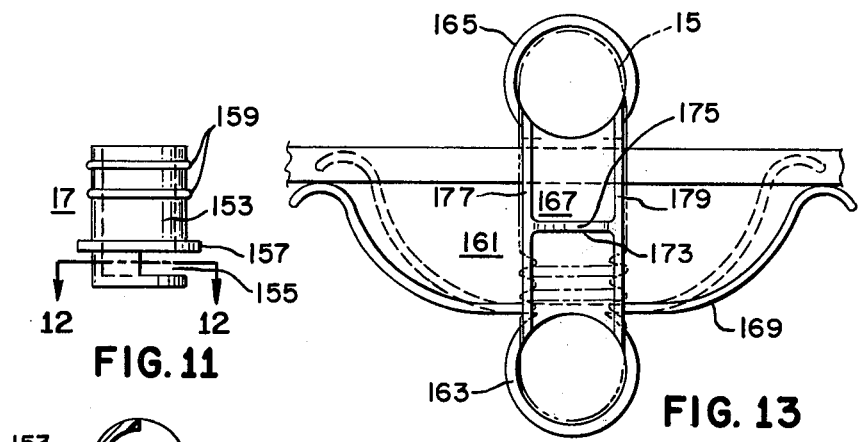
FIG. 11
FIG. 12
FIG. 13
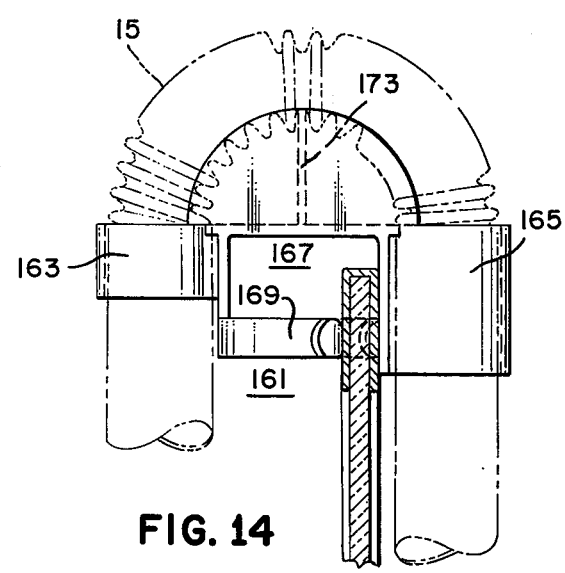
FIG. 14

LIQUID TREATING SYSTEM AND INCLUDED FILTER ASSEMBLY

Our invention relates to liquid treating systems and more particularly to the treatment of water in an aquarium, and will be described in connection with such application.

The health and welfare of aquarium fish are largely dependent upon the quality of the water in the aquarium. To maintain a standard of quality necessitates the use of filters and associated pumps for circulating the water through the filters while replenishing the oxygen in the water. The present invention relates to an improved system for treatment of the water of an aquarium though it is not restricted to such use.

Among the objects of our invention are:

1. To provide a novel and improved liquid treating system and included filter assembly;
2. To provide a novel and improved liquid treating system wherein various components may be assembled and included in the system without the necessary use of tools;
3. To provide a novel and improved filter assembly housing of the modular type permitting of a very flexible arrangement of filter materials and other liquid treating means;
4. To provide a novel and improved filter assembly housing comprised of a plurality of interchangeable screens;
5. To provide a novel and improved filter screen adaptable for use in the fabrication of a filter assembly;
6. To provide a novel and improved pump and control assembly adaptable for use with a filter screen of the present invention;
7. To provide a novel and improved intake strainer for the suction line of the pump in a liquid treating system;
8. To provide a novel and improved discharge distributing nozzle for aerating the liquid in a liquid treating systems; and
9. To provide a novel and improved bracket for supporting a hose on the rim of a tank such as an aquarium tank.

Additional objects of our invention will be brought out in the following description of a preferred embodiment of the same, as applied to an aquarium water treating system, wherein FIG. 1 is a view, partly in section, of a modular type filter housing assembly comprising a plurality of screens, a pump and control assembly;

FIG. 2 is a view in section of a modular type filter housing assembly without the pump and control assembly;

FIG. 3 is an end view of either of the aforementioned filter housing assemblies, depicting an end cap component;

FIG. 4 is a view taken in the plane 4—4 of FIG. 2;

FIG. 5 is a view in section taken through a tie rod assembly comprising a clamping means for holding the screens in assembly; the view being in the plane 5—5 of FIG. 3;

FIG. 6 is a view in section taken in the plane 6—6 of FIG. 5;

FIG. 7 is a view taken in the direction of 7—7 of FIG. 1;

FIG. 8 is a view in section through an aquarium, depicting a strainer and distributor installed in the aquarium as terminal components of the system;

FIG. 9 is an enlarged view depicting the strainer partly in section;

FIG. 10 is a view in section taken in the plane 10—10 of FIG. 9;

FIG. 11 is an enlarged view in elevation of the distributor depicted in FIG. 8;

FIG. 12 is a view in section taken in the plane of 12—12 of FIG. 11;

FIG. 13 is a plan view taken in the plane 13—13 of FIG. 8 and depicting a bracket for supporting a hose in straddling position over the upper edge of an aquarium wall;

FIG. 14 is a view in elevation of the bracket of FIG. 13 and depicting in greater detail, the structure of the bracket.

Figure 1:
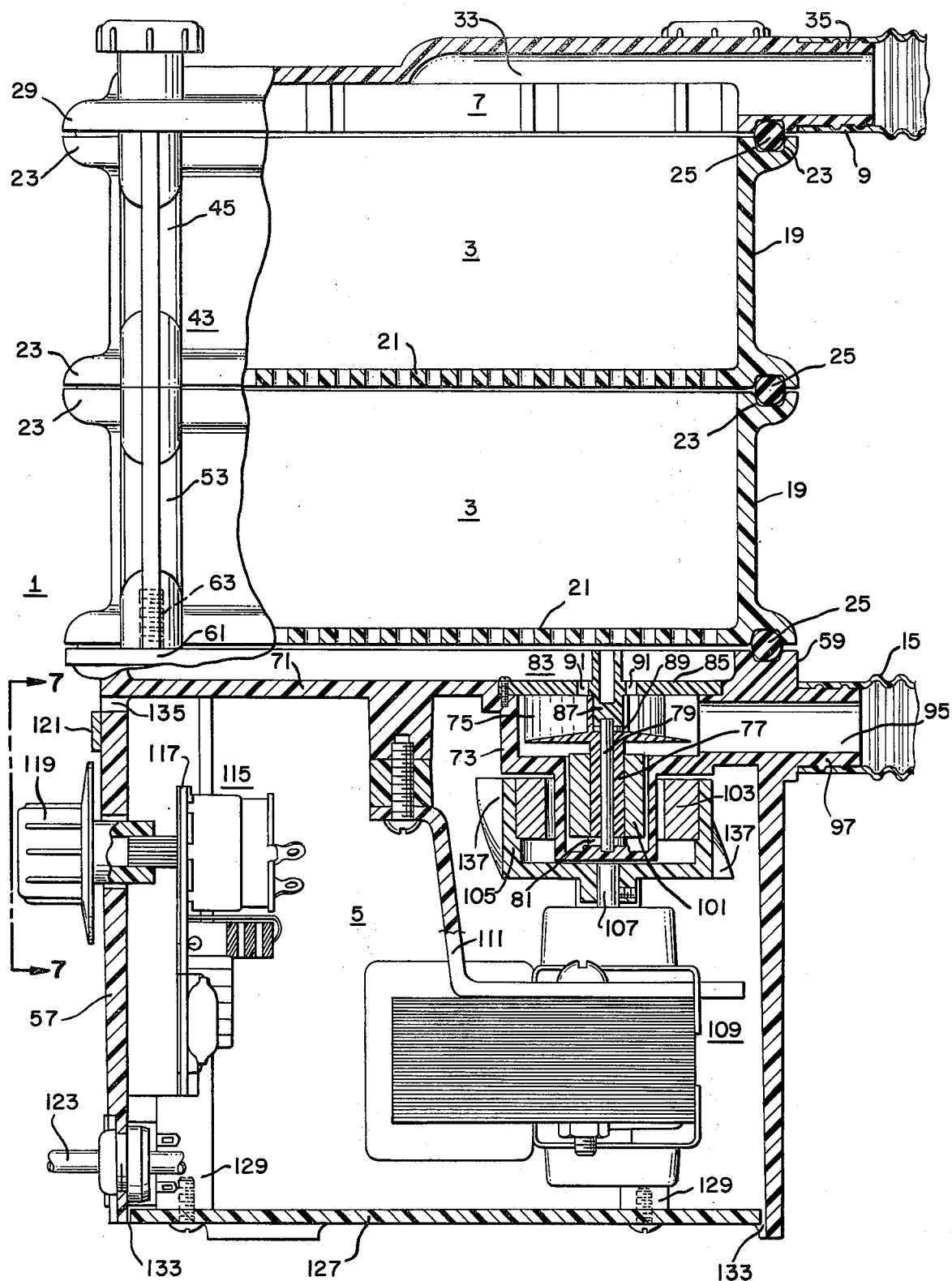

Referring to the drawings for details of the invention in its preferred form, the filter assembly depicted in FIG. 1 is a power filter 1 assembled from modular components and involving one or more modular screens 3 in functional relationship, coupled at one end, to a pump and control assembly 5 and capped at its other end by a cover plate 7.

A hose line 9 coupled to a strainer assembly 11 in an aquarium 13, is adapted to be connected at its other end to the end cap 7 of the modular filter to comprise a suction line while the pump and control assembly 5 is connected by a similar hose 15 to a distributor 17 which is supported on a wall of the aquarium, at an elevation enabling discharge at approximately water level therein.

Each of the filter screens 3 constitute a modular unit adapted for use as a filter component, either by itself or in conjunction with additional screens, and comprises a receptacle, preferably cylindrical in contour, and including a side wall 19 and a screen bottom 21, such screen bottom receptacle being bounded at its upper and lower rims by a seal engaging means in the form of a trough 23 adapted to engage an O-ring 25 and cooperate with a corresponding trough of a similar filter screen to effect sealing between such filter screens.

The trough is made preferably of slightly greater width than the diameter of the O-ring in its normal state, to permit of compression of the O-ring for sealing purposes without causing the O-ring to squeeze out between the screens which it is to seal.

The screen bottom is preferably a perforated wall formed integrally with the side wall, rather than inserting a screen into the position shown.

The end closure 7 has a seal engaging means matching that at either end of a screen, such seal engaging means, like with the screen, comprising a circular trough 29 adapted to receive the O-ring which is positioned in the trough of a proximate screen, to permit sealing under pressure, of the cap to either end of a screen.

Such closure or cap has a radially disposed flow passageway 33 formed integrally therewith and extending from the center of the cap to a point beyond, to provide an extension 35 for attachment of a hose, such as hose 9 or 15.

Extending beyond the O-ring 25 and bounding the same, is a flange 39 provided with four openings on the corners of a square, each of these openings to permit of anchoring one end of a tie rod assembly 43 which, in conjunction with other similar tie rod assemblies, function to clamp the modular filter assembly with the various screens and other components in sealing engagement with one another.

Such tie rod assembly involves one or more tie rod components 45 adapted for connection, one to the other, as by threading one to the other by means of molded in studs 47 and inserts 49. If each component were provided with a female thread or insert 49 at one end and a male thread or stud 47 at the other, then at one end of an assembly of such components, one would have a female thread, or insert, and at the other end, a male thread or stud, whereby, if thumb screws 51 or their equivalent were to be applied at one end, then corresponding thumb nuts would have to be applied to the opposite end.

We prefer uniformity at each end of an assembly of such components, preferably in the form of a female thread or insert and accordingly, to accomplish this, we provide for use as the last tie rod component in such an assembly, a component 53 having a female thread or insert 49 at each end. Thus thumb screws can now be applied at either end or any apparatus to be connected to a screen in lieu of a cap, may have corresponding studs molded therein.

The male or female threaded elements, as the case may be, being molded into the ends of the tie rod components, the ends of these components are preferably substantially cylindrical. To facilitate manual threading of one tie rod component to the adjacent component and thereby avoid the need for tools, the intermediate portion of each tie rod component is so molded as to provide longitudinal ribs 55, thus enabling the fingers to grasp and rotate the component more effectively.

The pump assembly in the embodiment of FIG. 1, comprises a housing 57 which at one end is formed with a trough 59 matching that of a screen, thereby adapting this housing to be sealed to the end screen of a filter assembly to form a power filter. Like the end cap, this end of the housing is provided with a flange 61 extending beyond the trough and at points corresponding to the flange holes in the cap, provided with moled in studs 63 to which the lowermost tie rod component 53 may be threaded.

The pump housing at its sealing end, is spanned by a wall 71 formed with an integral stepped recess 73 to provide a leakproof housing for a pump impeller 75, preferably of plastic, formed with an integral shank 77 and through which runs a longitudinal metal shaft 79 of stainless steel on which the impeller rotates.

At its lower end, the impeller assembly is rotatably supported on a thrust bearing washer 81 with the shaft 79 centered in a small cavity formed in the floor in the recess 73.

At its upper end, the impeller is rotatably supported in a bearing block 83 comprising a plate 85 spanning the recess 73 and having an integral depending boss 87 rotatably receiving the upper end of the shaft and facing a thrust bearing washer 89 surrounding the shaft, in engagement with the impeller.

Access for liquid to the impeller chamber is provided through a plurality of openings 91 in the bearing block plate and surrounding the depending boss, this constituting the suction end of the impeller pump.

Discharge from the pump is provided through a passageway 95 through a wall of the housing in proximity to the impeller chamber and extending beyond the wall of the housing to provide an extension 97 for attachment of the hose 15. The pump being of the impeller type, this discharge passageway is preferably tangential to the impeller.

It is noted that the stepped recess in which the impeller assembly is installed, provides a completely sealed chamber except for the suction inlet openings 91 and the discharge passageway 95.

To provide drive means for the impeller under these conditions, we drive magnetically through the non-magnetic walls of the recess.

For this purpose, we assemble magnetic material about the shank 77 of the impeller, in the form of a cylinder 101 of magnetic material which is either press fitted or otherwise secured to the shank.

Surrounding the lower portion of stepped recess and in the plane of the cylinder of magnetic material carried by the shank of the impeller, is a ring 103 of magnetic material, which is rotatably supported in its operative position by a cup 105 of non-magnetic material such as rubber or plastic on the upper end of the drive shaft 107 of an electric motor 109, carried on a bracket 111 bolted to one or more bosses depending from the upper end wall 71 of the housing.

The cylinder mounted on the impeller shank and the surrounding ring of magnetic material are suitably premagnetized to provide alternate north and south poles in a common plane, whereby, upon rotation of the surrounding ring 103 by the drive motor, the magnetic coupling between the rotating ring and the cylinder will cause a resulting rotation of the impeller, and without the necessity of any mechanical drive connection between them.

We prefer to provide speed control for the motor as it will enable compensating for increasing accumulation of residue in the filter, until the filter requires cleaning. By such control, motor speed may be adjusted upwardly as filtered material increases resistance to flow through the filter.

Control of the drive motor speed may be effected through the use of any available speed control circuit, though we prefer a circuit of the transistorized type utilizing printed circuit techniques and a potentiometer 115, with all elements mounted on a printed circuit board 117 supported within the housing in spaced relationship to a wall thereof, with the shaft of the potentiometer directed toward the housing wall, where it may be coupled to the shank of an external control knob 119 passing through the housing wall. Molded or affixed to the wall of the housing in association with the potentiometer knob, is an indicator 121.

Power to the drive motor via the control circuit is taken into the housing through a cable 123 passing through the housing wall adjacent the lower end thereof and suitably anchored therein.

At its lower end, the housing is provided with a floor 127 which is installed by bolting it to suitable inwardly directed bosses 129 on the interior wall of the housing.

To provide for ventilation of the components within the housing, the floor is somewhat smaller than the bottom of the housing, leaving a peripheral opening 133 about the floor for the intake of cooling air, while an appropriate slot 135 in the wall of the housing adjacent its upper end, provides for exit of such air. To assure adequate flow of air, forced circulation is provided for by vanes 137 about the cup and preferably molded integrally therewith.

Without the pump and control assembly, the filter might be completed by the addition of a cap similar to that at the upper end, such cap then being clamped and sealed to its proximate screen by thumb screws 51 similar to those used in sealing the cap at the upper end. Each cap thus provides an attachment for a hose, to include the filter in a system where the pump may be located elsewhere, the intake or suction line 9 being connected to the upper end of the filter as shown, while the discharge from the filter will ultimately be directed through hose 15 to the distributor.

The pump and control assembly is capable of use as such, unattached to a filter, by applying to its upper or suction end, a cap 7.

As previously indicated, the suction line starts with a strainer assembly 11 in the lower portion of an aquarium, and this is flow connected to an end of the flexible corrugated hose 9 by a section of tubing 139 which friction fits at one end into an end of the strainer assembly and at its other end, into the proximate end of the flexible corrugated hose 9.

The strainer assembly is preferably molded of plastic in the form of a tube 141 having a base 143 of somewhat larger diameter and a peripheral rib 145 spaced from the other end, said rib being of a diameter corresponding substantially to that of the base. That portion of the tube between the peripheral rib and base is provided with longitudinal slots 149 for intake of liquids, while that portion beyond the peripheral rib is of an internal diameter such as to frictionally receive the one end of the coupling tube 139.

A screen 151 encircles the sloted portion to impart the desired function to the strainer, namely that of straining out larger particles and debris from water entering the suction line.

Said screen is preferably in the form of a cylindrical mesh of plastic which is capable of being stretched over the base end of the strainer tube and contract to its original diameter in providing a substantially tight fit about the slotted portion of the tube, after clearing the base.

The distributor is also preferably molded of plastic, as a tube 153 having a closed bottom end slotted adjacent the bottom to approximately half its diameter to form a discharge slot 155. This slotted portion is preferably separated from the remaining portion by a peripheral rib 157, such remaining portion being adapted to frictionally fit into an end of the corrugated flexible hose 15 which carries the discharge from the pump to the tank. Ribs 159 may be provided on that portion which fits into the hose to assure retention of the distributor in the presence of prevailing discharge pressures.

While the strainer assembly functions at the bottom of the aquarium tank, the distributor should be supported for discharge at approximately the surface of the water in the tank, in order to agitate the water and break up any surface accumulation of scum or debris to thereby enhance aeration of the water, so vital to the well being of the fish in the aquarium. In this connection, the opening in the distributor provides for a fan shaped discharge which functions very effectively in performing this function.

To effectively maintain both the strainer assembly and the distributor in their functional positions in the aquarium, we provide a novel bracket 161 for this purpose. Such bracket, also preferably molded of plastic, basically comprises a bridge 167, from which is supported an integrally molded leaf spring 169 of the same material.

The bridge is of sufficient length to straddle the upper edge of aquarium walls of varying thicknesses, with the spring bearing against the inner side of the aquarium wall and the outside end of the bridge in contact with the outer surface of the wall, thus effectively clamping the bracket at any selected location along the upper edge of the aquarium. Supported at the inside end of the bridge is an associated tube 163 which is preferably slightly shorter than a similar tube 165 which lies outside the confines of the aquarium tank.

The tubes are of a diameter sufficient to permit threading therethrough of the corrugated flexible hose 9 or 15 as the case may be, whereby such hose may be brought in from the outside and caused to enter into the tank to any desired extent, and forming an arc between the two tubes. In lieu of the tubes 163, 165, other guide means such as clips may be employed.

Of substantial importance in connection with this bracket, is a locking feature which will retain the hose against displacement, once an adjustment has been made. Such locking feature takes advantage of the corrugations in the hose and involves a transverse plate 173 extending upward from the bridge at approximately the midpoint thereof, and terminating at its upper end in a concave edge 175 enabling this plate to fit about the tube between two of the corrugations. With the hose so engaged, it cannot slide out of adjustment.

To impart rigidity to this plate 173 and at the same time determine a proper arc for the hose when in locked position, the plate is molded integrally with opposing arcuate side walls 177, 179 extending upwardly from the bridge and integral therewith, with a spacing between them somewhat less than the outside diameter of the hose, whereby the hose in its locked position will rest upon and follow the contour of these arcuate side walls.

To affect a readjustment of the hose for any purpose, one need only lift the hose out of engagement with the locking plate, make the necessary adjustment and then restore the hose to its locked position.

While the illustrated embodiments of the invention depict but two screens in assembled relationship to one another, in the formation of a filter, it will be apparent that the invention permits of any number of screens from one on up and as for the contents of such screens, this may be varied to suit the needs of the occasion, such screens being adapted to accommodate any type of filter material and in any combinations.

From the foregoing description of our invention in its preferred form, it will be apparent that the same is subject to alternation and modification without departing from the underlying principles involved, and we do not desire to be limited in our protection to the specific details illustrated and described, except as many be necessitated by the appended claims.

I claim:

1. A filter assembly comprising a plurality of screens stacked end to end, each of said screens including a receptacle having a screen bottom and a side wall molded together as a unit, said screen bottom receptacle being bounded at its upper and lower rims by a seal engaging means, an end closure at each end of said stacked screens, each end closure having a seal engaging means opposing that of the proximate screen, a seal between the opposing seal engaging means, and means for clamping said stacked screens to seal said seal engaging means to said seal, said clamping means including a plurality of tie rod assemblies at spaced locations about said screens with each tie rod assembly comprising a plurality of disengageable interlocking tie rod assembly components, whereby said tie rod assemblies may be adjusted to accommodate filter assemblies of varying numbers of screen receptacles.

2. A filter assembly in accordance with claim 1, characterized by each said seal engaging means including a trough, and said seal comprising an O-ring between opposing throughs, and said clamping means including a flange on each end closure extending beyond the boundries of said screen bottom receptacles, and said plurality of tie rod assemblies connecting said flanges at spaced locations about said screen bottom receptacles.

3. A filter assembly in accordance with claim 2, characterized by one of said end closures including a pump assembly comprising a housing having means at one end for sealing the same to such filter, a pump in said housing, a flow intake passageway from said filter to said pump and a flow discharge passageway from said pump through a wall of said housing, and means for controlling said pump.

4. A filter assembly in accordance with claim 3, characterized by said control means including a motor drive coupled to said pump, and a drive motor speed control for said pump accessible externally of said housing.

5. A filter assembly in accordance with claim 3, characterized by said housing including a wall spanning the proximate end of said filter and having a recessed portion to from a leak proof pump chamber, a plate spanning said recessed portion, an impeller having a shank rotatably supported at one end of the bottom of said recessed portion and at its other end in said plate, said plate having an opening to admit liquid from the proximate screen bottom receptable to said pump chamber, and further characterized by said means for controlling said pump including a cylinder of magnetic material affixed about said shank, a drive motor in said housing below said pump chamber and having a drive shaft in substantial alignment with said impeller shank, a magnet surrounding said recess portion of said spanning wall in a plane passing through said cylinder of magnetic material about said impeller shank, and means accessible externally of said housing for adjusting the speed of said motor.

6. A filter assembly in accordance with claim 2, characterized by each of said tie rod assemblies including a plurality of connected components, terminating at one end in a female thread and at its other end in a male thread, and an additional component having like threads at each end, said additional components being threadedly connected to an end of said plurality of connected components, whereby both ends of said tie rod assembly will terminate in a like thread to receive thumb nuts of like character.

* * * * *